United States Patent [19]
Levine

[11] Patent Number: 5,093,958
[45] Date of Patent: Mar. 10, 1992

[54] AUTOMOBILE FLOOR MAT ANCHORING SYSTEM

[76] Inventor: Lloyd Levine, 8435 Telfair Ave., Sun Valley, Calif. 91352

[21] Appl. No.: 530,963

[22] Filed: May 30, 1990

[51] Int. Cl.$^5$ .................. A47G 27/04; B62D 25/20
[52] U.S. Cl. ............................................. 16/4; 16/8; 296/97.23
[58] Field of Search ................... 16/4, 8; 296/97.23

[56] References Cited

U.S. PATENT DOCUMENTS

| | | | |
|---|---|---|---|
| 3,858,268 | 1/1975 | Pollack | 16/8 |
| 4,033,011 | 7/1977 | Endo et al. | 16/4 |
| 4,588,628 | 5/1986 | Roth | 296/97.23 |
| 4,810,024 | 3/1989 | Heller | 296/97.23 |
| 4,901,961 | 2/1990 | Gish | 16/8 |

FOREIGN PATENT DOCUMENTS

| | | | |
|---|---|---|---|
| 1215133 | 9/1986 | Japan | 16/8 |

*Primary Examiner*—Robert L. Spruill
*Assistant Examiner*—Carmine Cuda

[57] ABSTRACT

To prevent an automobile mat from moving forward, a strap with a metal or plastic loop at the end is attached to the rear underside of a floor mat. In front of the automobile seat one side of an elongated "S"-shaped clip is forced over the exposed edge of the automobile's original carpeting. The other side of the clip is then in an upward direction with the open end of the clip facing toward the rear of the automobile. The loop attached to the floor mat is inserted into the upward facing portion of the "S" clip. The length of the strap attached to the loop is sized to allow hand space to reach under the floor mat during the attaching process. The "S" clip is made of a spring-type material, shaped to tightly squeeze over and be tightly held by the thickness of the automobile carpeting. The shape of the clip also prevents the unintentional separation of the loop from the clip.

In alternate embodiments a strap extension assembly is used to vary the length of strap so that the "S" clip can be attached to other portions of the vehicle, allowing the invention to be used in different vehicles. In one version, a buckle assembly is used to attach the strap extension to the floor mat strap.

In yet another embodiment a strap hook is used in place of the "S" clip and is adapted to be inserted into the slots provided by the seat track.

8 Claims, 2 Drawing Sheets

AUTOMOBILE FLOOR MAT ANCHORING SYSTEM

BACKGROUND OF THE INVENTION

1. Field of the Invention

This invention relates to automobile accessory floor mats and more particularly to apparatus for anchoring removable floor mats to automotive carpeting.

It should be noted that the preferred embodiment of this invention is not applicable to all types of vehicles. It is useful in those vehicles in which the original automobile carpeting has an exposed edge to which the invention attaches. Furthermore, the invention presupposes that OEM carpeting is securely held in place, since the mat fastening system of the present invention attaches to this carpeting. Furthermore, the invention is applicable to any overlying mat which should be removably attached to a carpet having an exposed edge.

It should also be noted that there are other embodiments disclosed herein which alternately attach to the seat track or to other fixed structures within the vehicle.

2. Background Art

In recent years, virtually every manufacturer of passenger automobiles has provided carpeting as standard floor covering in their automobiles. This original equipment carpeting supplied by the automobile manufacturer is very vulnerable to wear, as there is considerable foot movement concentrated in a relatively small area. It is difficult and expensive to replace worn out automobile carpeting.

It has become common for automobile manufacturers, automobile dealers and automobile accessory suppliers to provide removable floor mats, to be placed on top of the automobile carpeting to protect the automobile carpeting from wear.

One risk of having a floor mat on top of the automobile carpeting is that the action of the driver's feet tends to force the floor mat forward and into the brake and accelerator pedal area. Floor mats can then bunch up or otherwise interfere with the proper operation of the pedals.

Floor mat slippage has been suspected as the cause of some automobile accidents. Slipping mats are also suspected of becoming entangled with the accelerator pedal to cause unexpected changes in the vehicle's speed, sometimes known as unintended acceleration.

To avoid the problem of slipping or moving automobile floor mats, several solutions have previously been attempted. These solutions are generally divided into two categories: passive and active.

"Passive" solutions are those which are built into the mat structure and do not require any action by the mat installer to secure the mats in place, other than positioning the mats in the vehicle. These solutions by mat manufacturers include a vinyl backing with raised cleats, a vinyl backing with corduroy-type ribs running width-way across the mat and open cell foam or sponge rubber backings. These passive solutions have been somewhat effective in reducing mat slippage for some drivers, but none has been effective in eliminating mat slippage for all drivers.

"Active" solutions to the problem of mat slippage require some positive action to be taken by the mat retailer or the vehicle operator to fasten the mats in place. It is relatively simple for a mat manufacturer to attach one end of a fastening system to the mat. The problem is to find a place in the car to which the other end of the fastening system can be attached. The seat cannot be used, since all seats are adjustable back and forth to accommodate drivers of different heights. A mat fastening system attached to the seats would pull the mats out of position every time the seats were moved up or back.

Automobile manufacturers are now beginning to address the problem of providing a place on the vehicle to anchor one end of a mat fastening system. Audi AG, in the 1985 model year began installing two metal posts in front of each seat. These posts are approximately ¼" in diameter and rise above the automobile carpeting by approximately ⅜". Floor mats provided by Audi and other after-market mat manufacturers could then be attached to the Audi supplied posts. The most common method of attaching the mats to the posts is to have two cutouts in the mat to correspond to the position and size of the posts. The cutouts are then positioned over the posts with some provision included for keeping the mats from lifting off the posts.

BMW, in the 1988 model year, began providing a mat anchoring system on selected BMW cars. Their system is similar to a lock and key arrangement. There are two "locks" in front of each seat. The locks are in actuality a ½" oblong opening extending approximately ¼" into the floor of the car. At the end of the oblong opening, the ½" oblong becomes a circle of ¼" diameter. The oblong shaped bottom of the "key" goes through the floor mat and into the oblong hole in the floor of the car. When the "key" is fully inserted, it is turned 90 degrees to "lock", thereby securing the floor mat to the floor of the car. BMW has announced that their floor mat anchoring system will be standard equipment on all their 1991 cars.

The fact that Audi and BMW have provided fairly elaborate anchoring systems for floor mats is an indication that some automobile manufacturers are beginning to address the serious safety problem of slipping floor mats. However, current model Audi and BMW's account for only a tiny fraction of the automobiles in use.

Some mat manufacturers have active mat fastening systems designed for use in cars that do not provide a built-in anchor. Racemark International, Inc. uses a system, covered by U.S. Pat. No. 4,425,690, for the following vehicles: Mercedes Benz, Porsche, Jaguar, Sterling, Range Rover and Volvo. Their system consists of a clip attached to a bent pin similar to a drapery hook.

This system has several problems which keep it from being completely effective. (1) There is a reluctance on the part of the buyers of these new luxury automobiles to puncture their new carpeting with a thick pin. (2) It has become the custom of many automobile manufacturers to run electronic wiring under the carpeting and there have been instances where pin-type attaching devices have shorted out this wiring. (3) When pin-type attaching devices have been used in older cars, there have been occasions where the pin tore the original car carpeting when a force was applied to the floor mats. This is undoubtedly because the strength of the original carpeting had deteriorated with age. (4) The clip, which is attached to the edge of the mat, at the point where the mat binding is sewn, has caused the mat binding to tear away from the mat when force is applied to the mat itself. (5) The hook and clip attachment requires approximately 1½" clearance from the end of the mat to point where the pin is inserted into the car's carpeting.

In some cars, such as Mercedes Benz, the mats sit in a well. The natural position of the mat is at the back of the well. Use of the Racemark clip and pin arrangement requires that the mat sit in an unnatural position, approximately 1½" forward from the back of the well. The fact that it is difficult to position the mat may limit its use by many Mercedes Benz owners.

SUMMARY OF THE INVENTION

What is needed and what is provided by the system of the present invention is a simple, inexpensive fastener which easily anchors the mats in place and resists a tendency toward forward motion of the mat. The preferred embodiment of the present invention uses a unique combination of strap, loop and a springy, elongated "S" shaped clip to solve the problem of slipping floor mats.

The loop or ring is at the end of a strap which is attached to the underside of the floor mat. One side of an elongated "S" shaped clip is forced over the exposed edge of the automobile carpeting located near the automobile seat. The loop attached to the floor mat is then slid into the upper side of the "S" clip. In another embodiment, a belt buckle assembly is placed at the end of the strap instead of a closed loop. This allows the strap length to be adjusted depending upon the spatial area available in the car model in which the floor mat is placed.

The length of the strap is adapted to provide space for reaching the loop during the attachment or removal process as well as allowing lateral movement of the loop in relationship to the clip. The strap length is also selected so that the floor mat is properly aligned with the automobile carpeting when the loop is attached to the "S" clip.

The shape and springy characteristic of the clip prevents it from being unintentionally disconnected from the automobile carpeting or the mat loop. The clip design can be similar to that of a commercially available belt clip for holding keys or key rings. It has been determined that the combination of these features results in a reliable floor mat fastening system that keeps the mats from sliding forward, resists forces that would tend to unintentionally disconnect the system and yet allows easy removal and reinstallation of the floor mats for cleaning.

In other embodiments, the "S" clip is attached either to the side of the seat rail or to the metal floor plate at the back of the front seat, where it acts to restrain the floor mat. In these embodiments, there is a strap extension which is placed intermediate the floor mat strap and the "S" clip. The strap extension has a loop at one end which hooks onto the "S" clip. The other end of the strap extension terminates in a female portion of a buckle assembly. The floor mat strap, instead of terminating in a loop, terminates in the male portion of the buckle assembly which mates with the female portion of the buckle assembly. The design of the buckle assembly allows the strap length to be adjusted.

In yet another embodiment, the "S" clip is replaced by a "strap hook" which is pressed into one of the slots provided in the seat track. This embodiment also utilizes a strap extension with a buckle assembly intermediate the floor mat strap and the strap hook.

The novel features, which are believed to be characteristic of the invention, both as to organization and method of operation together with further objects and advantages thereof, will be better understood from the following description considered in connection with the accompanied drawings in which several preferred embodiments of the invention are illustrated by way of example. It is to be expressly understood, however, that the drawings are for purpose of illustration and description only and are not intended as a definition of the limits of the invention.

DETAILED DESCRIPTION OF THE DRAWINGS

Figure 1:
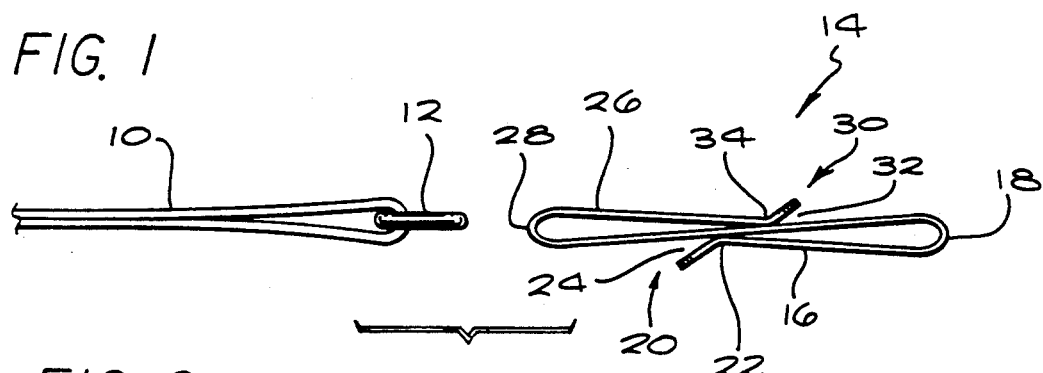
FIG. 1 is a side view of the invention showing the strap, loop and "S" clip.
Figure 2:
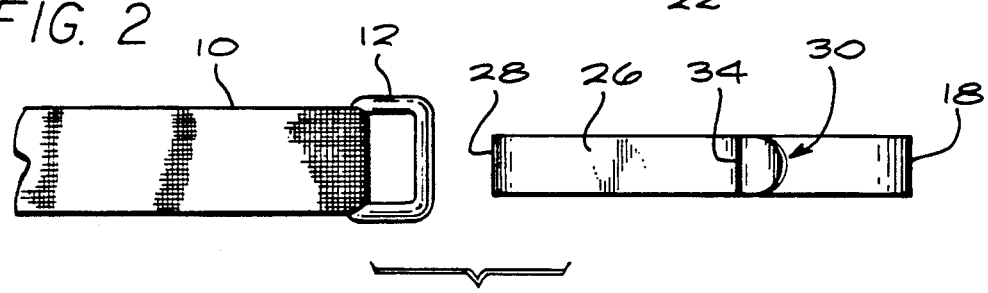
FIG. 2 is a top view of the invention showing the strap, loop and "S" clip of FIG. 1.

Turning first to FIGS. 1 and 2, there is shown a preferred embodiment of the invention, which includes a strap 10, a loop 12 and an "S" shaped clip 14. The strap 10 may be made from a variety of sturdy, flexible materials such as cotton, polypropylene or nylon. Loop 12 as shown is rectangular but can be a "D" ring or a circular ring in alternate embodiments. Loop 12 is attached to one end of strap 10. The other end of strap 10 is permanently fastened to the floor mat (not shown) either by being sewn to the floor mat or by being mechanically fastened or riveted.

The "S" clip 14 is made of a springy material, such as metal or plastic. The clip 14 has a bottom side 16, whose springy characteristic allows the clip to be forced over the edge of the car's carpeting to the closed end 18. Near the open end 20 of the bottom side 16 of clip 14, there is a narrowed gap portion 22 to squeeze the car's carpeting and prevent the unintentional removal of the clip 14. Adjacent the narrowed portion 20, at the terminal edge of the bottom side 16, there is a widened portion 24 which allows the carpeting to more easily be inserted into the clip 14.

The clip 14 also has a top side 26, with a closed end 28 and an open end 30. The open end 30 terminates in a widened portion 32. Adjacent the widened portion 32 is a narrowed portion 34. The loop 12 is inserted over the widened portion 32, past the narrowed portion 34 and is held by the closed end 28, where it is restrained.

Figure 3:
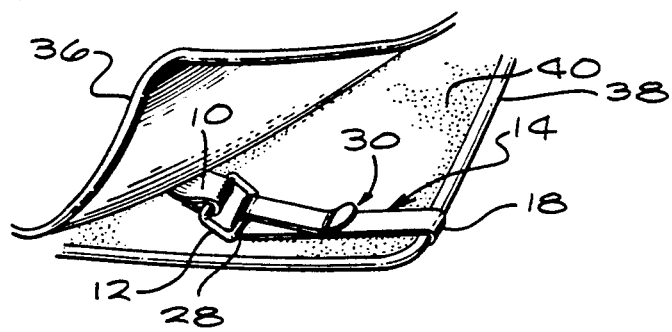
FIG. 3 is a perspective view of the combination installed in a vehicle.

In operation, the strap 10 and the loop 12 are attached to a floor mat during the manufacturing process. The point at which the strap is sewn to the floor mat is critical. The resulting position of the loop 12, after it has been placed over clip 14, must be such that the mat overlies the total length of the clip 14. As shown in FIG. 3, the rear edge of the floor mat 36 has been "folded back" to illustrate the installation of the anchoring system, which will line up with the rear edge 38 of the automobile carpeting 40 when floor mat installation is complete.

As shown The "S" clip 14 is inserted over the rear edge 38 of the automobile carpet 40 until the closed end 18 of the bottom side 16 of the "S" clip 14 is against the edge 38 of the automobile carpet 40. The floor mat 36 is then approximately positioned in the automobile. The loop 12 is inserted over the top side 26 of the clip 14. It is the "play" provided by the length of the strap 10 that allows the installer to have sufficient hand clearance and visual access to complete the attachment of loop 12 over the "hook" or widened end 32 of the clip 14. The floor mat 36 is then pulled forward until further forward movement is restrained by the hook closed end 28 which restrains the loop 12. Due to the careful placement of the strap 10 and loop 12 during the mat production, the mat 36 is now properly positioned in the automobile and the edge of the mat 36 will be at the edge 38 of the automobile carpet 40.

Removal of the floor mat is easily accomplished. The floor mat 36 is lifted up and back at the same time. This action disconnects the loop 12 from the clip 14. The floor mat 36 is then easily removed for cleaning or other purposes.

Figure 4:
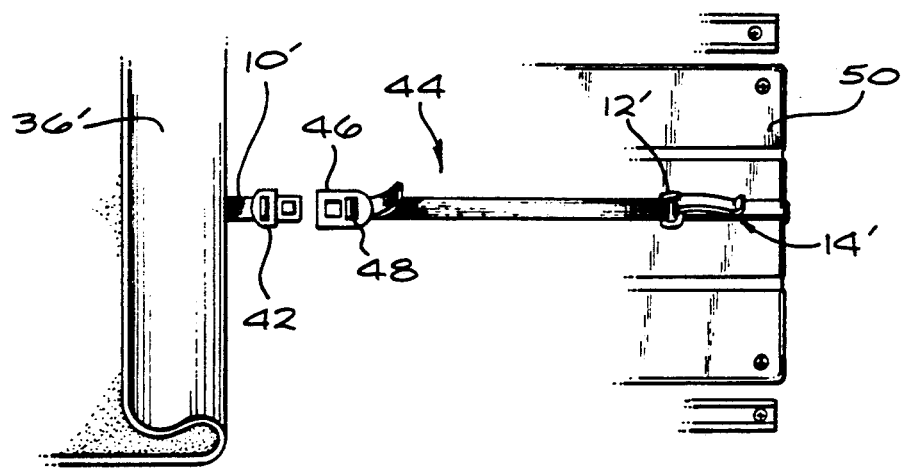
FIG. 4 is top view of another embodiment of the invention utilizing a floor mat strap extension.

An alternate embodiment is shown in FIG. 4 for vehicles which do not have carpeting with an exposed edge at the base of the front seat. In this embodiment, the strap 10' has a male buckle member 42. A strap extension 44 has a female buckle member 46 at one end and a loop 12' at the other end. The female buckle member 46 is adapted to receive male buckle assembly 42 and has a strap adjustment means 48 to adjust the length of the strap extension 44. This allows the a clip 14' to be placed to other fixed structures in the vehicle.

In FIG. 4 the clip 14' is placed on the metal floor plate 50 at the back of the front seat. Loop 12' is then placed over clip 14' as in the preferred embodiment. The male buckle member 42 is inserted into female buckle member 46 and strap extension 44 is adjusted to the proper length by the adjustable strap extension means 48. The floor mat 36' is now restrained by metal floor plate 50.

Figure 5:
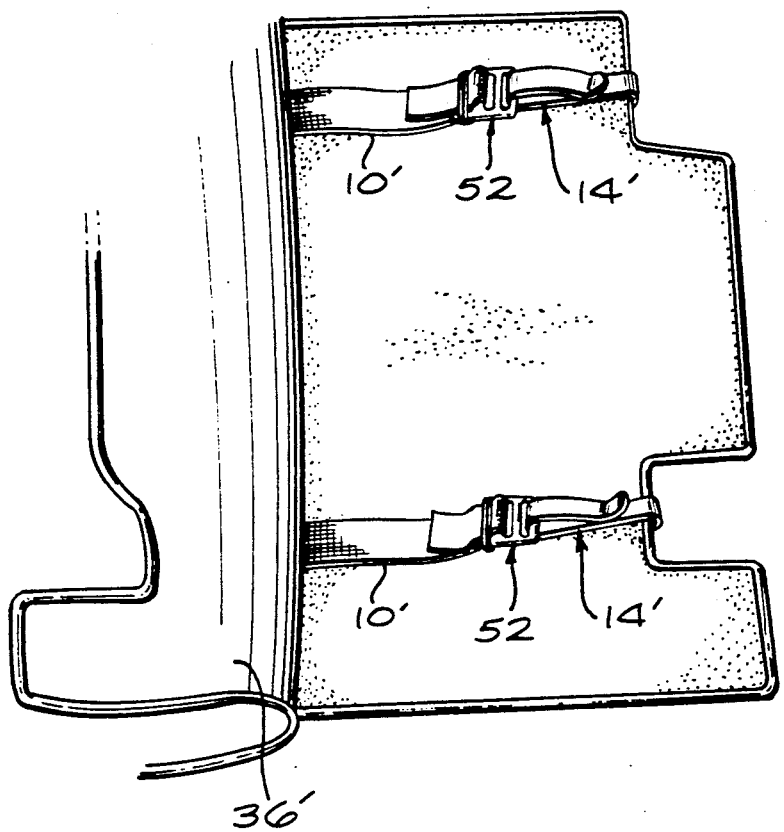
FIG. 5 is top view of another embodiment of the invention utilizing an adjustable buckle at the end of the floor mat strap.

FIG. 5 shows another embodiment of the invention with an adjustable safety buckle 52 placed at one end of strap 10' instead of loop 12. The safety buckle 52 is also adapted to be placed over clip 14' as before. In this embodiment, the adjustable safety buckle 52 allows the length of strap 10' to be adjusted so that the same mat 36' can be placed in different environments and still be properly positioned in the automobile for proper restraint by clip 14'.

Figure 6:
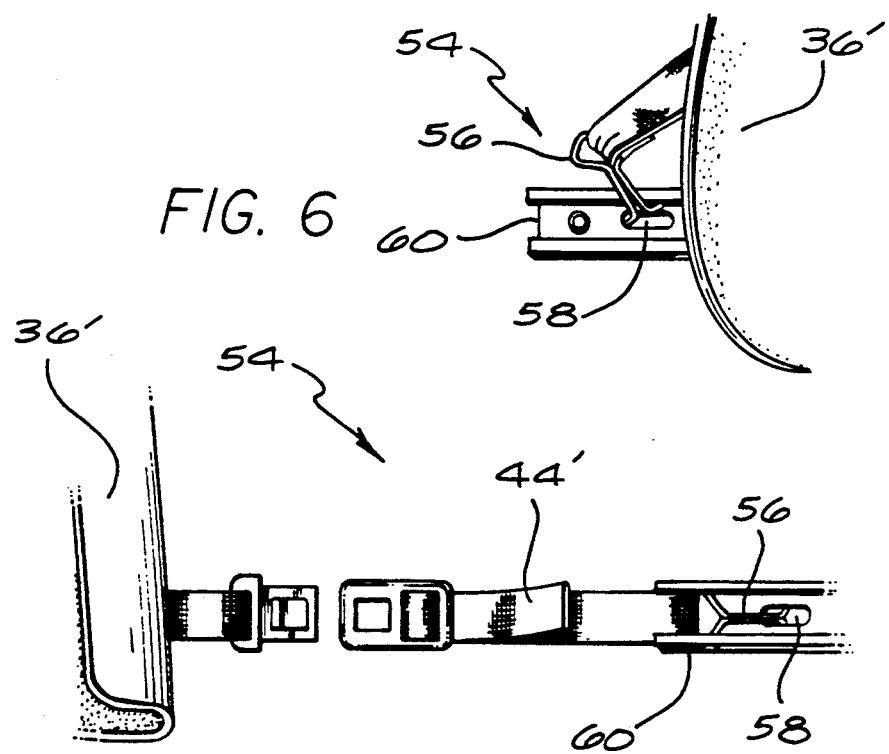
FIG. 6 is a top view of an embodiment of the invention utilizing an alternate means for attaching the mat to a vehicle.

FIG. 6 shows yet another embodiment of an assembly 54 wherein the clip 14 is replaced by a strap hook 56. Here the assembly 54 is shown with a strap extension 44' similar to the one discussed above. The strap hook 56 is inserted into a slot 58 provided in the seat track 60.

Assembly 54 is also intended for vehicles which do not have carpeting with an exposed edge at the base of the front seat. The placement of the strap hook 56 in slot 58 restrains the floor mat 36'.

Changes and modifications in the specifically described embodiments can be carried out without departing from the scope of the invention, which is intended to be limited only by the scope of the appended claims.

What is claimed is:

1. A vehicle floor mat anchoring system comprising:
a) first attachment means, adapted to be affixed solely to the underside of a floor mat, said first attachment means including a strap having a first end fixedly attached to the underside of a floor mat, and a second end having hooking means, said first attachment means further including means for adjusting the length of said strap, wherein said means for adjusting the length of said strap comprises a buckle having at least one slit pair therethrough, said slit pair being adapted to receive said second strap end therethrough and to frictionally retain said second strap end therein; and
b) second attachment means, adapted to be affixed to the vehicle for engaging said first attachment means.

2. A vehicle floor mat anchoring system comprising:
a) first attachment means, adapted to be affixed solely to the underside of a floor mat including a strap having a first end fixedly attached to the underside of the floor mat and a second end having connecting means, said first attachment means further comprising means for adjusting the length of said strap wherein said means for adjusting the length of said strap includes a second strap having a first end adapted to connect to said first strap at the free end thereof and further includes means for changing the length of said second strap, said second strap having a second end terminating in means adapted to engage second attachment means; and
b) second attachment means, adapted to be affixed to the vehicle for engaging said first attachment means at said second end.

3. A vehicle floor mat anchoring system comprising:
a) first attachment means, adapted to be affixed solely to the underside of a floor mat including a strap having a first end fixedly attached to the underside of the floor mat and a second end having connecting means; and
b) second attachment means, adapted to be affixed to the vehicle for engaging said first attachment means connecting means, said second attachment means including an "s" shaped spring clip having first and second fastening loops, said first fastening loop being adapted to engage the vehicle and said second fastening loop being adapted to engage the free end of said first attachment means.

4. The floor mat anchoring system of claim 3, wherein said clip has a first arm extending from said first loop in a first direction and a second arm extending from said second loop in the opposite direction and a central arm portion connecting said first and second loops, one of said arms being adapted to engage and disengage with a vehicle and the other of said arms being adapted to engage and disengage with said first attachment means.

5. The floor mat anchoring system of claim 4, wherein said clip of said first fastening means is biased to frictionally attach to a vehicle.

6. A vehicle floor mat anchoring system comprising:
a) first attachment means, adapted to be affixed solely to the underside of a floor mat; and
b) second attachment means, adapted to be affixed to the vehicle for engaging said first attachment means, said second attachment means including first and second fastening means, said first fastening means adapted to engage the vehicle and said second fastening means adapted to engage said first attachment means, said second fastening means comprising a clip adapted to engage and disengage said first attachment means, said clip of said second fastening means being biased to releasably retain said first attachment means.

7. A vehicle floor mat anchoring system wherein the vehicle has a seat track having slots therein, the anchoring system comprising:

a) first attachment means, adapted to be affixed solely to the underside of a floor mat; and
b) second attachment means, adapted to be affixed to the vehicle for engaging said first attachment means, said second attachment means comprising hooking means having a first end and a second end, said first end of said hooking means attached to said first attachment means and said second end of said hooking means terminating in a pair of bias members adapted to be inserted in the seat track slots and adapted to be frictionally retained within the slots.

8. A floor mat anchoring system comprising:

a) a strap of predetermined length having a first and a second end, said first end being fixedly attached to the underside of a floor mat, and said second end having a closed loop attached thereto; and
b) fastening means including a springy, "s" shaped clip having a first arm adapted to forcibly engage a permanently installed automobile carpet, and having a second arm adapted to engage and disengage said closed loop,
the floor mat and automobile carpet being aligned in a predetermined fashion, based upon the predetermined length of said strap.

* * * * *